United States Patent [19]

Bertling

[11] 4,130,266
[45] Dec. 19, 1978

[54] PRESSURE CONTROL VALVE

[75] Inventor: Johannes-Gerhard Bertling, Vaihingen, Fed. Rep. of Germany

[73] Assignee: Robert Bosch GmbH, Stuttgart, Fed. Rep. of Germany

[21] Appl. No.: 802,332

[22] Filed: Jun. 1, 1977

[30] Foreign Application Priority Data

Jun. 5, 1976 [DE] Fed. Rep. of Germany ....... 2625512

[51] Int. Cl.² .............................................. F16K 31/12
[52] U.S. Cl. ..................................... 251/50; 251/61.5; 137/510
[58] Field of Search .................. 137/510; 251/61.5, 50

[56] References Cited

U.S. PATENT DOCUMENTS

| | | | |
|---|---|---|---|
| 1,314,977 | 9/1919 | Neal | 137/510 X |
| 1,885,851 | 11/1932 | McKee | 251/61.3 |
| 2,902,048 | 9/1959 | Ryan | 137/510 |
| 3,052,259 | 9/1962 | Van Der Velden | 137/510 |

Primary Examiner—Harold W. Weakley
Attorney, Agent, or Firm—Edwin E. Greigg

[57] ABSTRACT

A pressure control valve for regulating the gas pressure in a conduit is composed of two chambers, one of which receives control fluid under well-defined pressure for the purpose of adjusting the pressure of the medium in the second chamber and in the conduit to follow changes of the control fluid pressure. A soft, non-resilient double diaphragm divides the two chambers and the space between the two diaphragms is accessible from the outside and may be supplied with gas or fluid at higher pressure. The valve has a compensating piston which is attached to the diaphragms and glides in a blind bore the end of which communicates with the second chamber in which the pressure is controlled.

9 Claims, 5 Drawing Figures

PRESSURE CONTROL VALVE

BACKGROUND OF THE INVENTION

The present invention relates to a pressure control valve for regulating the pressure in a conduit depending on the magnitude of a control pressure. The invention further relates to a pressure control valve which employs a non-elastically deformable diaphragm disposed within a pressure cell and defining two opposite chambers. One of the chambers contains a valve assembly with a seat which is opened and closed by a movable member attached to the diaphragm.

It is the purpose of the pressure control valves of this type to adjust the pressure in a flowing gaseous medium to a constant value or to the magnitude of a control pressure. Such valves are required when it is necessary to measure the flow rate of gases by permitting their flow from a high pressure level to a lower pressure. Known in the art are pressure control valves which employ soft yieldable diaphragms which are biased by one or several springs. The disadvantage of such valves is that the difference between the control pressure and the desired adjusted pressure is thus dependent on the excursion of the diaphragm which can be substantial in certain applications.

OBJECT AND SUMMARY OF THE INVENTION

It is thus a principal object of the invention to provide a pressure control valve in which the above-mentioned disadvantages are avoided. It is a further object of the invention to provide a pressure control valve which permits the measurement of a wide range of flow rates of gases across a relatively small pressure drop by providing a relatively large valve stroke so as to maintain a constant controlled pressure. Yet another object of the invention is to provide a pressure control valve which permits rapid alteration of the direction of the effective pressure without introducing dead times and permitting a rapid and reliable actuation free from hysteresis even for very small flow rates.

These and other objects are attained according to the invention by providing a pressure control valve in which two diaphragms are rigidly coupled together to the valve closing member. The space between the two diaphragms may be coupled to a source of pressure of magnitude greater than the pressure normally admitted to the control pressure chamber or the comparison chamber of the cell. That side of the valve closing member which faces away from the comparison chamber, in which the pressure is controlled, is coupled with a relief piston which slides sealingly in a blind bore and which is provided with a channel leading from the bottom of the blind bore to the second chamber in which the pressure is controlled or compared. The manner of embodiment of the pressure control valve of the present invention makes it possible to dispense with supplementary biasing springs. The higher pressure level which exists between the two diaphragms pre-tenses these diaphragms and permits an exact equal pressure control free from dead times. The relief piston eliminates the influence of the pressurized medium on the uncontrolled side of the valve closing member because it is compensated for by the relief piston and the closure member. In one advantageous embodiment of the invention, the channel in the relief piston has a throttling bore, thereby achieving a damping effect on the motion of the closure member or the relief piston.

The invention will be better understood as well as further objects and advantages thereof become more apparent from the ensuing detailed description of preferred embodiments taken in conjunction with the drawing.

DESCRIPTION OF THE PREFERRED EMBODIMENTS

Figure 1:
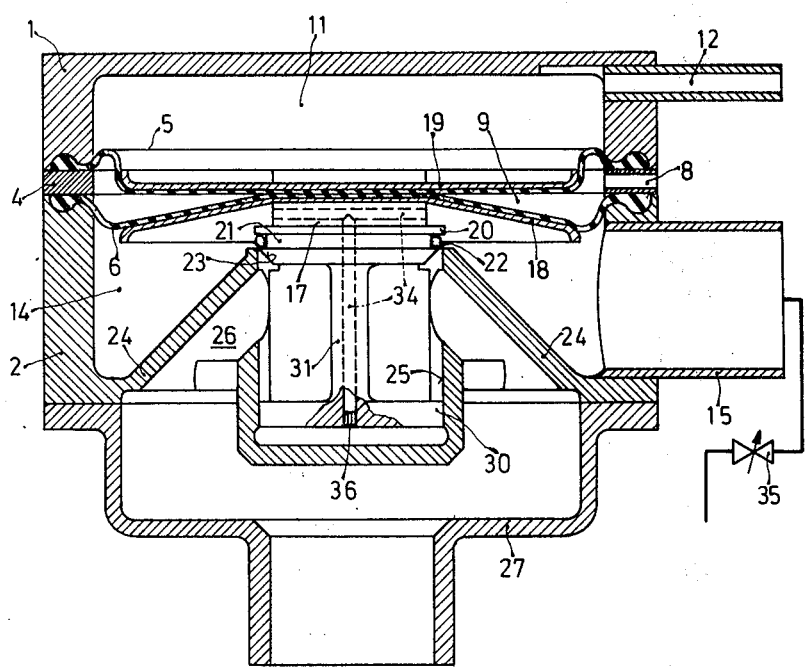
FIG. 1 is an axial cross section through a first embodiment of the pressure control valve according to the invention.

The preferred exemplary embodiment illustrated in FIG. 1 includes a dome-shaped housing part 1 and a second dome-shaped housing part 2 which are joined at their rims and between which is clamped a perforated ring 4, a first diaphragm 5 and a second diaphragm 6. The perforated ring has radial holes 8 which provide a communication from the space 9 defined between the two diaphragms and the external air.

The diaphragm 5 and the first dome-shaped housing part 1 define a pressure control chamber 11 which communicates through a line 12 with a suitable source of pressure. The second diaphragm 6 closes off the second housing part 2 and defines therein a comparison pressure chamber 14. This chamber receives the pressure to be controlled from a lateral connecting tube 15. Attached to the center of the diaphragms 5 and 6 is a valve closing member in the shape of a piston 17 which is firmly attached to the center of the diaphragms with the aid of diaphragm support discs 18 and 19. The valve closing member 17 thus couples the center of the diaphragms firmly together. The piston 17 extends into the comparison pressure chamber and is provided with a shoulder 20 as well as with an annular groove 21 containing an O-ring 22. A bore 25 within the second housing part 2 defines a valve seat 23 which cooperates with the O-ring 22 to provide a valve assembly controlling the passage of gas from the comparison chamber 14 into the bore 25. Lateral channels 26 permit the passage of gases to a collection area defined by the interior of a dome-shaped boss 27 attached by its rim to the housing part 2.

The piston 17 is continued axially beyond the shoulder 20 in the manner of a relief piston 30 which glides sealingly within the blind bore 25 and is attached to the main part of the piston by a shaft portion 31 having a star-shaped cross section. A channel 34 extends along the axis of the shaft portion 31 and a part of the piston 17 and continues laterally to communicate above the shoulder 20 with the comparison pressure chamber 14. Through the channel 34, the space defined between the bottom of the relief piston 30 and the end face of the blind bore 25 thus communicates at all times with the comparison chamber 14.

The manner of operation of the pressure control valve described is as follows. The collection boss 27 is coupled to a chamber or a source of relatively low pressure whereas the connecting stub 15 is connected through a throttling or metering device which is indicated in the drawing by a valve 35 to a source of pressure relatively higher than that admitted to the boss 27. The direction of flow will thus be from the connecting pipe 15 through the valve to the collection boss 27. As previously indicated, it is the purpose of this pressure control valve to adjust the pressure prevailing in the comparison chamber 14 and thus in the line leading to the valve 35 to be constant or to assume the magnitude of a control pressure fluid present in the chamber 11. It will be appreciated that the diaphragm acts to compare the pressure in the chamber 14 with the control pressure in the chamber 11. The effective surfaces of the two sides of the diaphragm are equal because the portion taken up by the cross section of the piston 17 is compensated for by the corresponding surface of the relief piston 30. If the valve is normally closed in its initial position, the low pressure prevailing downstream of the valve seat 23 has no effect on the position of the valve because it is compensated for by the relief piston. Thus the piston 17 may be displaced independently of the pressure changes taking place downstream of the valve seat. For this reason, the displacement of the piston and the adjustment of the flow cross section of the valve seat 23 is subject only to the forces deriving from the pressure difference between the control pressure chamber 11 and the comparison chamber 14. If the control pressure is higher than the pressure in the comparison chamber, the piston 17 moves in the direction of closing the valve, thereby reducing the flow over the valve seat and causing an increase of the pressure in the comparison chamber. If, conversely, the control pressure is lower than the pressure in the comparison chamber, the flow cross section increases and the pressure in line 15 decreases because of the throttling effect of the valve 35. While the above-described valve has been illustrated to have diaphragms of equal effective surfaces, it may also be advantageous to provide diaphragms of different effective surface area. This permits an increase or decrease of the pressure changes taking place as a result of changes in the control pressure. The channel 34 may also be restricted to provide a throttling effect to oppose motions of the relief piston 30 and provide damping. The degree of damping may be defined by a precise throttling bore 36 contained within the channel 34.

The valve may be employed advantageously for controlling the pressure of gaseous media and due to its unelastically deformable diaphragm and its pressure biasing, it operates free from hysteresis and assures a precise maintenance of a predetermined gas pressure. The large soft diaphragms used permit relatively large excursions of the valve closing element.

Figure 2:
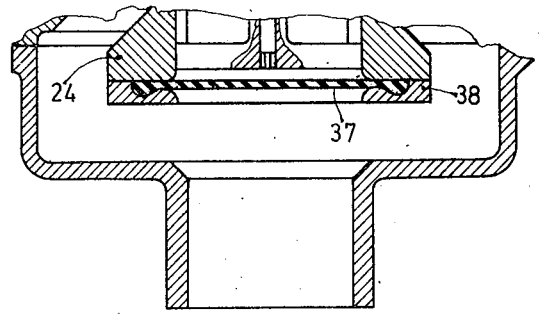
FIG. 2 is a cross section of a detail describing a variant of the invention.
Figure 3:
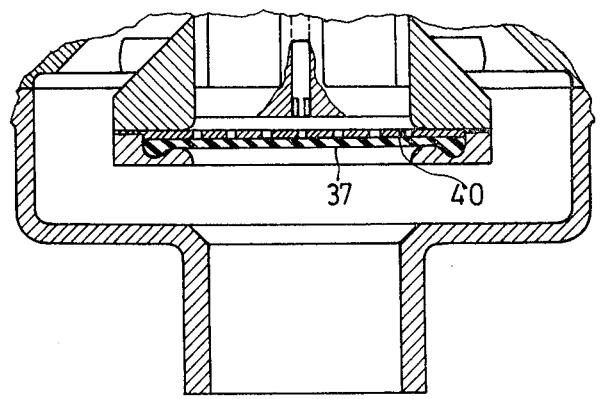
FIG. 3 is a sectional illustration of a detail of a second variant of the invention.
Figure 4:
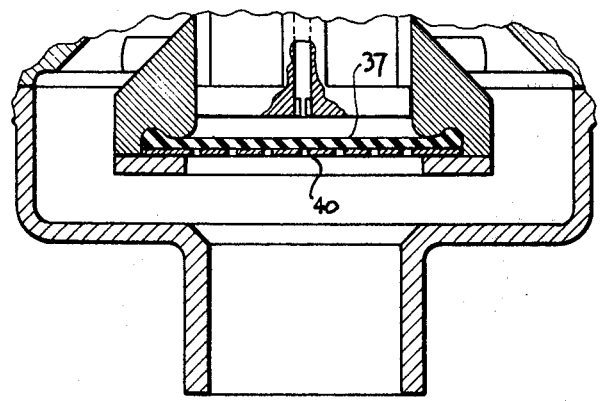
FIGS. 4 and 5 are sectional illustrations of third and fourth variants of the invention.

The dynamic behavior of the valve may be improved under certain conditions in the variants of the invention illustrated in FIGS. 2 and 3. In the variant illustrated in FIG. 2, the bottom of the bore 25 is formed by an elastic diaphragm 37, the rim of which is clamped sealingly in suitable manner to the central portion of the housing part 2 by means of a flange 38. The first variant of the invention illustrated in FIG. 2 operates as follows. When sudden changes occur in the pressure downstream of the valve seat 23, i.e., where the pressure is not regulated, it is desired that the valve rapidly adapt to the new conditions. If the cross section of the channel 34 is made deliberately narrow to obtain damping, the valve could not respond rapidly enough to an abrupt pressure change. The presence of the elastic diaphragm 37 still permits a rapid displacement of the piston 17 which causes an excursion of the diaphragm and thus distributes the equalization of pressure over a longer period of time.

Figure 5:
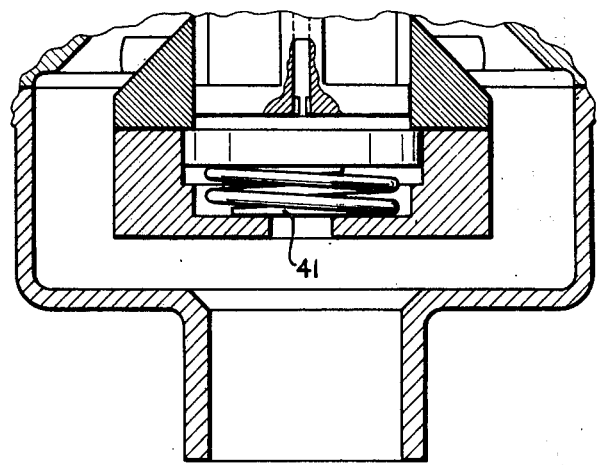

In the exemplary embodiment according to FIG. 3, the elastic diaphragm 37 is permitted to move only in the downward direction in the figure. In order to prevent motions of the diaphragm 37 in the direction of the relief piston, there is disposed a perforated plate 40 parallel to and adjacent the diaphragms 37 on the side nearest the relief piston. It would also be possible to dispose this perforated plate at a predetermined axial separation from the diaphragm 37 thereby permitting limited excursions of the diaphragm 37 in the upward direction. A limitation of this type may be provided on the other side or both sides of the diaphragm 37. In this way, a well defined desired dynamic coupling is obtained of the various parts of the valve. The purpose of the diaphragm 37 may also be served by suitably biased pistons with limited stroke, e.g. biased by a spring 41 (FIG. 5).

The foregoing relates to preferred exemplary embodiments and variants of the invention, it being understood that other embodiments and variants are possible within the spirit and scope of the invention.

What is claimed is:

1. A pressure control valve including a housing and non-resilient flexible diaphragm means in said housing dividing the interior volume thereof into a first chamber and a second chamber, and said housing including a valve seat disposed in said second chamber and a valve closing member attached to said diaphragm means to cooperate with said valve seat to control communication between said second chamber and interior portions of said housing downstream of said valve seat and wherein the improvement comprises:

said diaphragm means is composed of two substantially adjoining diaphragms fastened together at their centers and fastened to said valve closing member and moving therewith, said housing being provided with wall channel means for admitting pressurized fluid to the space between said two diaphragms; and a relief piston, attached to said valve closing member and extending beyond said valve seat and disposed to glide sealingly in a blind bore of said housing having a diameter equal to said valve seat to thereby define a variable space which communicates with said second chamber via a conduit in said relief piston;

whereby, when pressurized fluid is admitted to said first chamber, the excursions of said diaphragm means variably open said valve seat to thereby control the pressure in said second chamber.

2. A pressure control valve as defined by claim 1, wherein said conduit is narrowed to a defined cross section to provide a predetermined throttling effect.

3. A pressure control valve as defined by claim 1, wherein said blind bore has an expansible end wall.

4. A pressure control valve as defined by claim 3, further comprising means for limiting the axial excursion of said expandible end wall in at least one direction.

5. A pressure control valve as defined by claim 4, wherein said expandible end wall is a flexible diaphragm closing off said blind bore in sealing manner.

6. A pressure control valve as defined by claim 4, wherein said elastic expandible end wall is a piston sealingly guided in said housing and includes spring means for biasing said piston in at least one axial direction.

7. A pressure control valve as defined by claim 4, wherein said means for limiting the axial excursions of said wall is a perforated plate disposed in said blind bore between said relief piston and said expandible end wall.

8. A pressure control valve as defined by claim 4, wherein said means for limiting the axial excursions of said expandible end wall is a perforated plate disposed in said blind bore on the side of said expandible end wall remote from said relief piston.

9. A pressure control valve as defined by claim 1, wherein said valve closing member is provided with an annular groove within which is disposed a seal cooperating with said valve seat to provide sealing thereof.

* * * * *